United States Patent [19]

Reeve et al.

[11] 4,120,509
[45] Oct. 17, 1978

[54] SELF-STEERING TANDEM AXLE BOGIE

[76] Inventors: Richard James Reeve, 5505 E. Evergreen, Apt. 306, Vancouver, Wash. 98661; Dennis Raymond Shirley, 14670 NE. Russell Ct., Portland, Oreg. 97320

[21] Appl. No.: 789,883

[22] Filed: Apr. 22, 1977

[51] Int. Cl.² .............................................. B62D 13/00
[52] U.S. Cl. ................................. 280/81 A; 280/677; 280/426; 280/442
[58] Field of Search ................ 280/81 A, 81 B, 81 R, 280/677, 678, 679, 680, 681, 426, 442

[56] References Cited
U.S. PATENT DOCUMENTS

| | | | |
|---|---|---|---|
| 1,940,798 | 12/1933 | Hanna | 280/677 X |
| 2,227,448 | 1/1941 | Freeman | 280/680 |
| 2,874,973 | 2/1959 | Botkin | 280/677 |
| 3,162,463 | 12/1964 | Schmitz | 280/81 R X |

FOREIGN PATENT DOCUMENTS 1,171,758  6/1964  Fed. Rep. of Germany ........ 280/81 A

*Primary Examiner*—John P. Silverstrim

[57] ABSTRACT

A self-steering tandem bogie for the rear of an articulated vehicle. The bogie comprises a front and a rear axle which are universally attached to a pair of longitudinally extending walking beams for sliding motion thereon, affording angular variation of the axles during vehicle turning. The load of the vehicle is transferred to the bogie by a steering unit which is universally attached to the walking beams between the two axles. As the vehicle executes a turn, the steering unit rotates in the direction of vehicle turn, while the walking beams tend to maintain the straight-drive orientation. This relative movement between the steering unit and the walking beams is transmitted to the front axle by a pair of steering arms, causing the front axle to rotate in the direction of turn, and thereby facilitating vehicle turning.

7 Claims, 10 Drawing Figures

— Towing Vehicle
--------- Rear Steering Bogie
—·—·—·— Rear Conventional Bogie

SELF-STEERING TANDEM AXLE BOGIE

The present invention relates to articulated vehicles, and particularly, to a self-steering bogie for use thereon.

It is well known that large vehicles such as single unit trucks and semi-trailers employing fixed tandem axles, have inherent turning problems due to the fact that in turning, the rear of the vehicle must pivot about four fixed wheel points that tend to keep the rear of the vehicle in the straight drive position. As a result, the rear wheels of the vehicle are dragged through the turn with consequent lateral slippage and tire scuffing. In addition to the excessive tire wear and mechanical strain that results, the problems of lateral slippage can become quite serious on slippery roads, where lateral movement of the tires can cause dangerous skidding.

Another problem associated with turning a large vehicle employing a fixed angle tandem axle bogie, more serious in articulated vehicles than in single unit trucks, is the difference in turning radii between the towing vehicle and the rear of the trailer. Because the rear of the trailer follows a wider turning radius than the towing vehicle, the vehicle is difficult to maneuver in the city and dangerous to maneuver on winding roads with narrow shoulders. The present invention is designed to reduce the above-mentioned problems related to turning, particularly in articulated vehicles.

The invention comprises a pair of transversely extending wheel axles which are slidingly and pivotally attached to a pair of longitudinally extending walking beams, affording angular variation of the two wheel axles during vehicle turning and independent movement of each axle out of the plane common to the two axles. A transversely extending steering unit pivotally attached to the walking beams between the two axles transfers the load of the vehicle to the walking beams. As the vehicle executes a turn, the steering unit rotates in the direction of the turn while the walking beams tend to maintain the straight-drive orientation. The rotation of the steering unit is transmitted to the front axle by a pair of steering arms, causing the front axle to rotate, relative to the rear axle, in the direction of vehicle turn, thereby facilitating vehicle turning. The invention additionally provides means for locking the bogie in the straight-drive position.

Accordingly, it is one object of the present invention to provide a self-steering tandem axle bogie for the rear of an articulated vehicle to facilitate vehicle turning by providing angular variation between the two bogie axles during vehicle turning.

It is another object of the invention to provide a self-steering tandem axle bogie that requires little maintenance and is capable of supportng heavy vehicle loads such as large earth-moving equipment.

It is still another object of the invention to provide a tandem axle bogie for the rear of an articulated vehicle in which the self-steering mechanism of the bogie is relatively independent of vehicle load.

It is another object of the invention to provide a self-steering bogie with means for locking the bogie in the straight-drive position.

These and other objects and features of the invention are described more fully in the following description and accompanying drawings in which.

Figure 1:
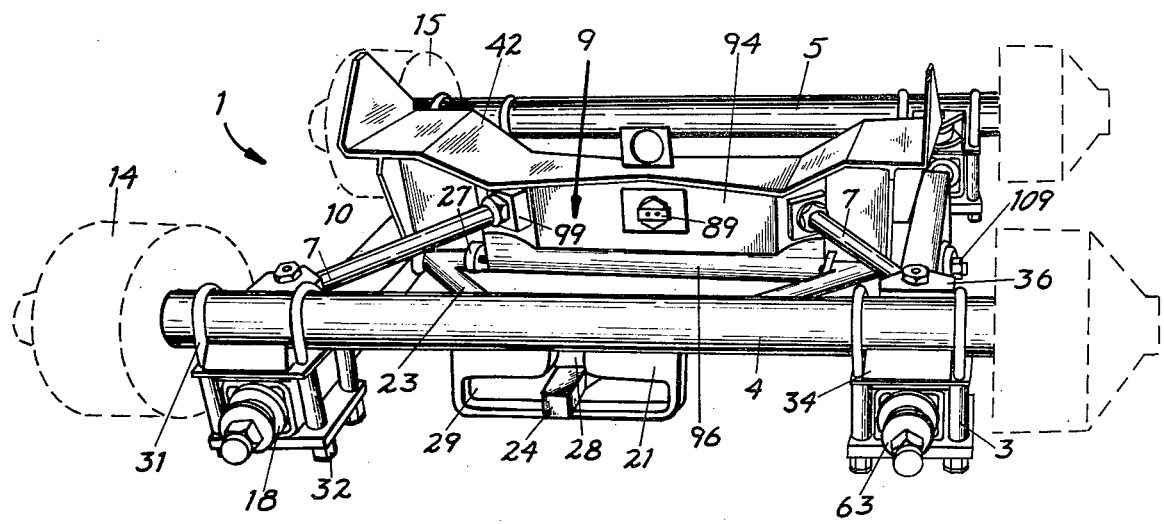
FIG. 1 is a front perspective view of the bogie.
Figure 2:
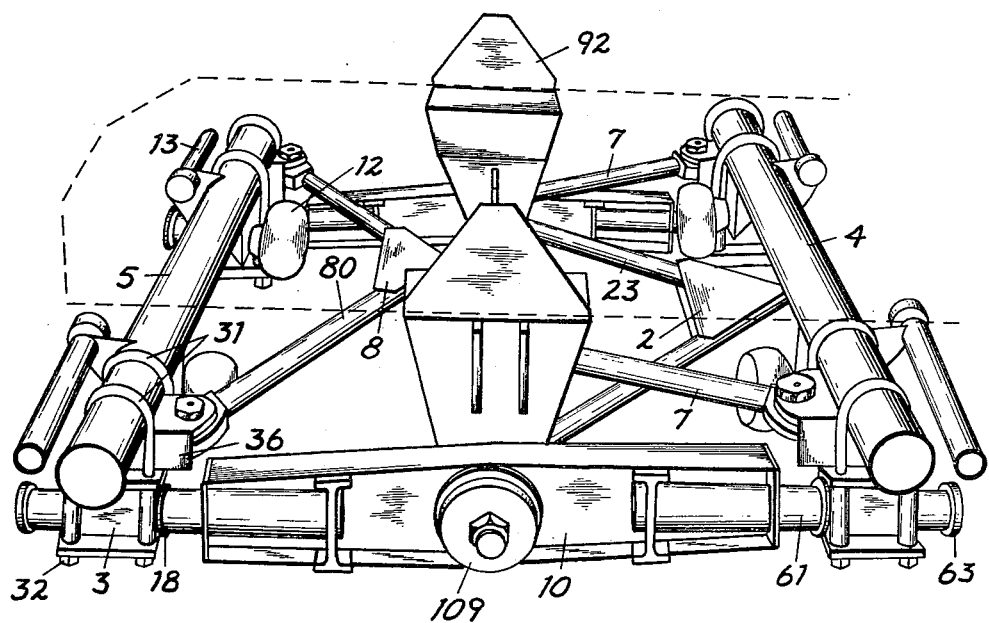
FIG. 2 is a side perspective view of the bogie.

The general features of the present invention are shown in the two perspective views, FIGS. 1 and 2. The bogie, referred to as 1, is supported by front and rear wheels 14 and 15 (shown in dotted lines in FIG. 1) which are rotatably attached to front and rear axles 4 and 5, respectively by conventional means. The wheels are adapted to receive either a single or double tire assembly (not shown). Each end portion of axles 4 and 5 carries a universal joint assembly 3, attached by a pair of U-bolts 31 which fit over the top surface of the axle and are secured at the bottom of the assembly by nuts 32. The upper part of each assembly 3 comprises a saddle member 34 adapted to fit under the axle and an attached bracket 36 for attachment of the steering arms 7 and trailing yoke arms 80 to the axles. The universal joint 37 of assembly 3 is mounted for rotation about a vertical axis through the center of the joint, and provides a cylindrical cavity extending logitudinally through the assembly.

Axles 4 and 5 are attached to a pair of frame-supporting members, or walking beams 10 for slideable and pivotal movement thereon. The beams, which may be of rigid construction as in the present embodiment, or spring-type beams that allow for vertical compression, support a pair of smooth-surfaced rods 61 that project longitudinally from the beam ends. Rods 61 are held within the cylindrical cavities of universal joint assemblies 3 to provide a slideable and pivotal attachment between the beams 10 and the axles, as will be explained. The ends of rods 61 are capped by rod plates 63. Wiper plates 18 affixed at each end of the assembly 3 cylindrical cavities serve to wipe the rods 61 free of mud and road dirt as the assemblies 3 slide along the rods.

The load of the vehicle is transferred to the bogie through a steering unit 9. This unit is a single welded unit comprising a vehicle-mounting plate 92 to which the rear of the vehicle frame is attached, a steering plate 94, and a lower tube 96. The steering unit is universally attached to the walking beams 10 by universal joints 109 at either end of tube 96.

Figure 3:
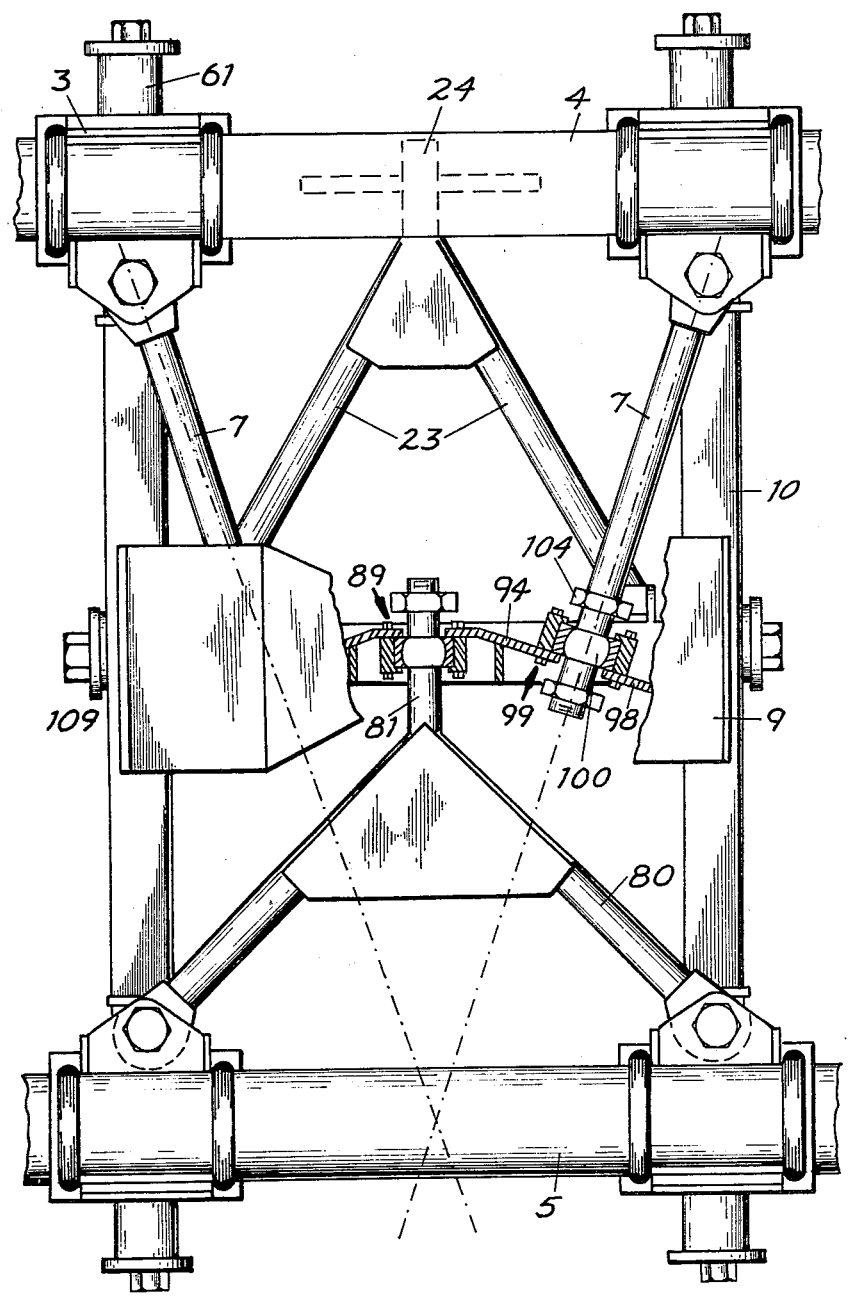
FIG. 3 is a partially cutaway plan view of the bogie in the straight-drive position.

Turning motion of the vehicle is transmitted from the steering unit to the front axle by a pair of steering arms 7. The proximal ends of arms 7 are universally attached to the rearwardly angled sections 98 of steering plate 94 by universal attachments 99 (FIG. 3). The distal ends of arms 7 are universally attached to the assembly brackets 36 by universal attachments 47, as explained below.

The steering unit is pivotally coupled to the rear axle by a trailing yoke 8 having a pair of fixed angle radial arms 80 and a pivot arm 81. The attachment of arm 81 to the center of steering plate 94 through the universal attachment 89 (FIG. 3) and the universal attachment of each arm 80 to the associated rear axle brackets 36 (FIG. 4), are identical to the attachments of steering arms 7 to steering plate 94 and to front axle brackets 36 respectively. The trailing yoke serves to maintain a constant distance between the steering unit and the rear axle, and is also referred to herein as rear coupling means.

The bogie additionally provides means for locking the wheels in the straight-drive position when required, e.g., when the vehicle is backing up. The locking means includes a locking yoke 2 which is attached to the steering unit 9 and a locking plate 21 welded to the front axle. The locking yoke comprises a pair of fixed radial arms 23 and a locking arm 24. The radial arms 23 area attached to the steering unit by hinge attachments 27. The locking plate 21, which provides a transverse guideway 29 and an upper locking notch 28, is welded to the lower side of the front axle. In the unlocked position locking arm 24 traverses the guideway 29 according to the angular position of the steering unit with respect to the front axle. To lock the bogie in the straight-drive position, the locking arm 24 is raised into the locking notch 28 by pneumatic means (not shown) attached to the front axle.

Perspective view FIG. 2 also shows the pneumatic brake cylinders 12 and brake arms 13 which are attached and operated by conventional means.

The configuration of the steering bogie in the straight-drive position is shown in plan view in FIG. 3. Axle universal joint assemblies 3 are spaced on rods 61 midway along the exposed portions of the rods. The steering unit 9 is attached to the walking beams 10 by universal joints 109 located midway between the two axles 4 and 5. Steering arms 7 are attached to the angled sections of steering plate 94 such that the longitudinal extensions of the two arms (shown in broken lines) intersect at the center point on the rear axle. The angular relationship between the steering arms and the steering unit determines the ratio of bogie self-steering angle to vehicle turning angle, as described below.

The partial cutaway view in FIG. 3 illustrates attachments 89 and 99 of the trailing yoke arm 81 and the steering arms 7 to the steering plate 94. These attachments comprise a spherical bushing 100, the bearing of which is clamped to the threaded end portions of the arms 81 or 7 by a pair of metal sleeves on either side of the bearing and nuts 104. The bushings are secured to the plate 94 by conventional means.

Figure 4:
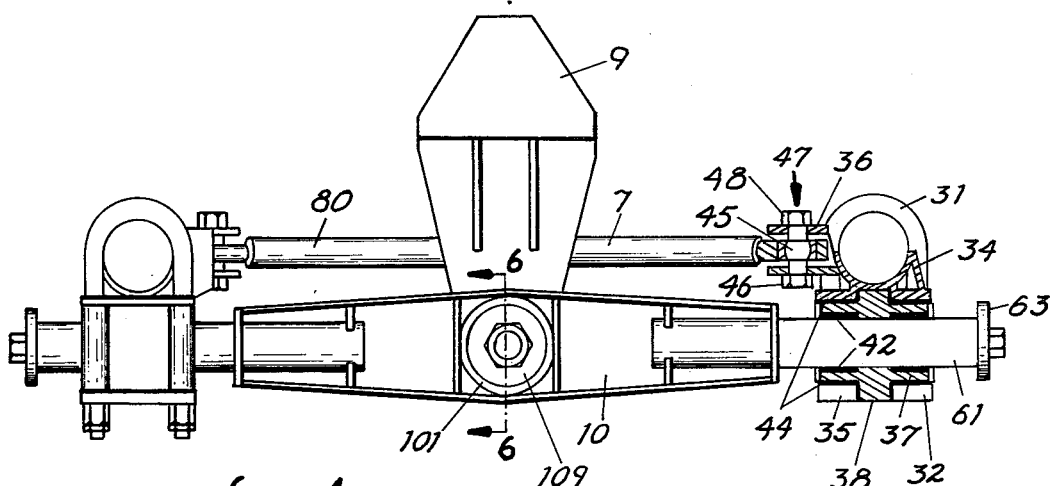
FIG. 4 is a partially cutaway side elevation view of the bogie.
Figure 5:
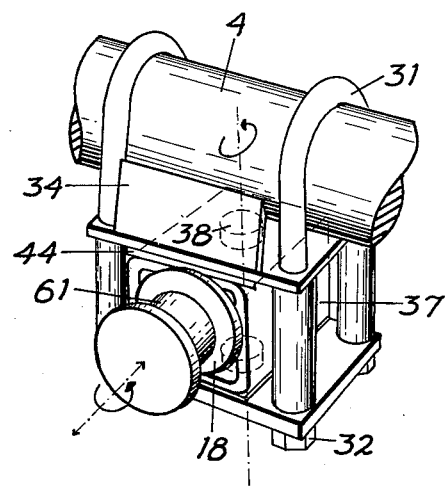
FIG. 5 is a perspective view of the attachment between an axle and a walking beam.

Axles 4 and 5 are joined to the walking beams 10 through the universal joint assemblies 3. With reference to FIG. 4, each universal joint 37 provides a lubricated cylindrical cavity lined by a pair of nylon sleeves 42 that contact rods 61 in a slideable tight-fitting relationship, joint 37 is housed between saddle members 34 and lower plate 35, with assembly 3 being secured to the axle by U-bolts 31 and nuts 32. A pair of pins 38 projecting vertically from the upper and lower surfaces of the universal joint 37 serve as pivot rods about which the joint can rotate within the assembly. The upper and lower faces of the joint 37 are insulated from the saddle member 34 and lower plate 35 by a pair of nylon slip plates 44 which facilitate rotational sliding motion of the joint within the assembly. Both slip plates 44, saddle member 34 and lower plate 35 have center holes through which the pins 38 protrude. It will be appreciated from FIG. 5 that this universal joint assembly provides 3° of motion between the axles and walking beams: longitudinal sliding motion of the assembly along the beam rod; rotation about the rod axis, which allows each axle to pivot independently out of the plane common to the two axles; and angular motion of the axles about the vertical axis through pins 38, permitting angular variation between the axles and the walking beams.

Steering arms 7 and yoke arms 80 are each attached to axle assemblies 3 by universal attachments, indicated at 47. With reference to FIG. 4, each such attachment includes a spherical bushing 45 mounted on the associated arm 7 or 80, and joined to the associated bracket 36 by a bolt 48 extending through the bracket and the bushing and secured to the bracket by a nut 46.

Figure 6:
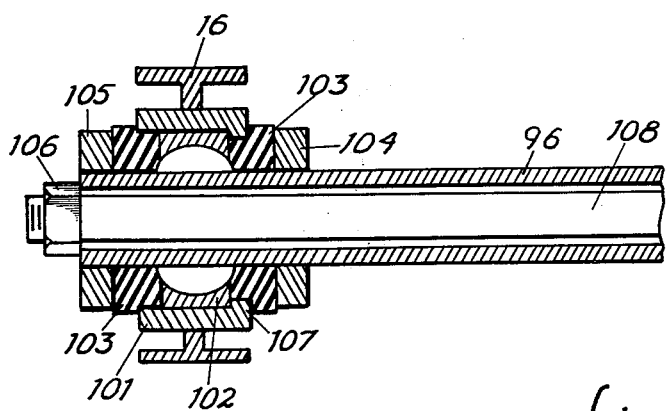
FIG. 6 is a cross-sectional view along line 6–6 in FIG. 4.

Also as shown in FIG. 4, each walking beam provides a transversely extending sleeve 101 which houses one of the two spherical bushing assemblies 109 that universally join the steering unit to the walking beams. Referring to FIG. 6, bushing assembly 109 comprises a spherical bushing 102, a pair of compressible rubber washers 103 on either side of the bushing, and inner and outer retaining washers 104 and 105. Inner washer 104 is rigidly attached to an end region of the tube 96 and the outer washer is secured to the assembly by tightening nut 106 on rod 108. This rod extends through both bushing assemblies and provides means for mutually tightening both bushing assemblies on the tube 96. Spherical bushing 102 slip fits on tube 96 and is restrained within sleeve 101 by the circumferential ridge 107 within the sleeve. When the bogie is in a turning configuration, the distance between the two sleeves 102 on walking beams 10 increases slightly, causing an inward movement of the two bushing assemblies 109. This movement is accommodated both by an inward sliding movement of tube 96 within the bushing bearing, and by compression of the rubber washer 103 adjacent to the outer retaining washer 105. In addition to serving as compressible spacers between the bushing 102 and the retaining washers, the rubber washers 103 prevent road dirt from entering the lubricated inner surface of the sleeve 101.

Figure 7A:
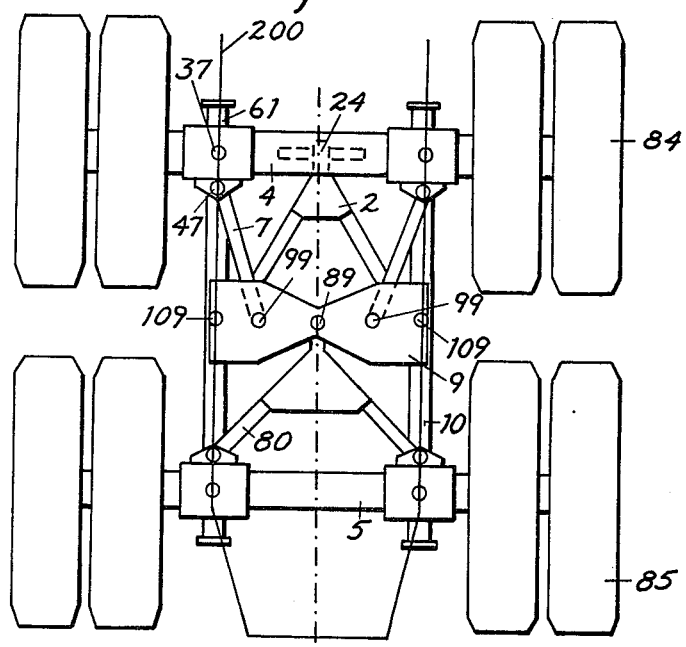
FIGS. 7a and 7b are simplified plan views of the bogie in the straight-drive and hard turn positions, respectively.

The operation of the above-described steering bogie will now be described with reference to FIGS. 7a and 7b. In the straight-drive position (FIG. 7a) the front and rear axles and the steering unit are mutually perpendicular to the two walking beams, so that the wheels are aligned with the vehicle frame 200. Steering arms 7 and trailing yoke arms 80 are symetrical about a midline which intersects the center pivot point 89 on the steering unit and points in the direction of travel. The locking yoke arm lies along this midline. The FIG. 7a configuration obtains exactly only when the vehicle is traveling on a smooth road surface. When the bogie encounters irregularities in the road surface, one or more of the wheels will be independently raised or lowered, producing a slight deviation from the straight-drive configuration.

Figure 7B:
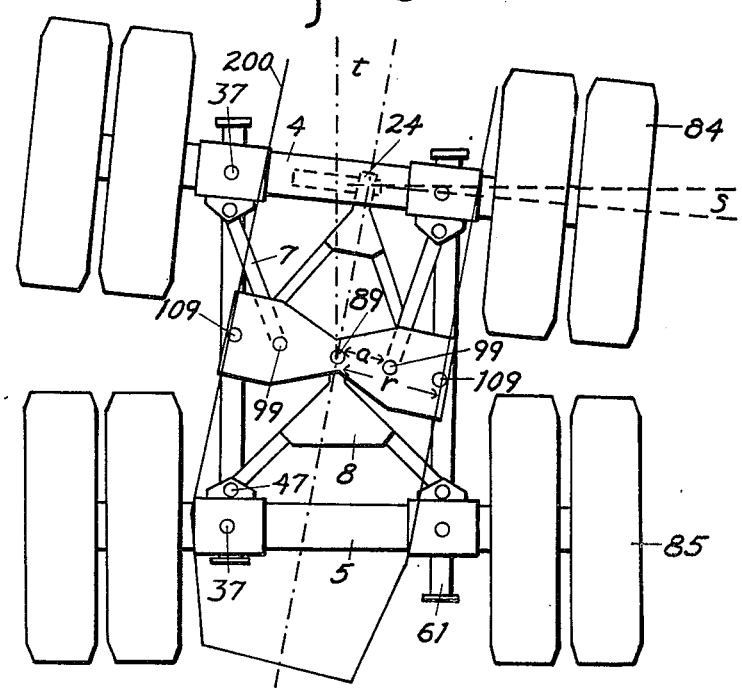

FIG. 7b illustrates the configuration of the bogie when the vehicle is executing a $t$ angle turn to the right. For purposes of explanation, the trailing yoke is used as a fixed point of reference. In actuality, the trailing yoke, by maintaining a constant distance between the pivot point 89 and the rear axle 5, allows the rear axle to adjust angularly, within the constraints of the walking beam rear rods 61, to the forces exerted on the rear wheels during vehicle turning. As the vehicle turns through angle $t$ the attached steering unit rotates an angle $t$ about the yoke pivot point. At the same time, tire contact with the road, tends to maintain the walking beams in the original direction of travel. Consequently the walking beams adjust to the steering unit rotation by shifting longitudinally with respect to one another. Viewed from the yoke pivot point 89, the right hand beam shifts rearwardly and the lefthand beam shifts forwardly each a distance of about r·t, where r is the distance between pivot points 89 and 109, and t is the turning angle in radians. Similarly, the right steering arm pulls the right front universal assembly rearwardly, and the left steering arm pushes the left front universal assembly forwardly, each a distance of about a·t, where a is the distance between pivot points 89 and 99. In the embodiment described herein, a is roughly one-half r, so that the ratio of bogie steering angle s to vehicle turning angle t is about one-half. It is apparent that this ratio can be increased or decreased by increasing or decreasing a. In the extreme case where a equals r, i.e., where the steering arms are attached to the outer sides of the steering unit, the longitudinal positions of the front axle universal assemblies 3 on front rods 61 remain fixed during vehicle turning, since the two moment arms defined by distances a and r act through the same angle. In such cases, the steering arms function only to prevent sliding motion along front rods 61, and could be replaced by any other means for preventing front rod sliding movement. This case is considered a trivial embodiment of the present invention.

During vehicle turning, the longitudinal displacement of the walking beams occurs both by sliding movement of universal assemblies 3 along the beam rods, and by pivotal and compressional motion within the universal joints 109, as described with reference to FIG. 6. Rotation of the front axle through angle s is accomodated by rotation of the universal front universal joints 37 about their vertical axes. Universal joints 89 and 99 on the steering unit and 47 on each axle assembly allow the steering arms and trailing yoke to adjust to the angular variation between steering unit and front and rear axles. The extent of allowable bogie steering is determined by the length of the transverse guideway 29 of locking 21. As the steering unit and attached locking yoke 2 rotate through an increasingly greater angle, the lock yoke arm 24 will eventually be stopped by the guideway, preventing further rear steering in response to vehicle turning.

Figure 8:
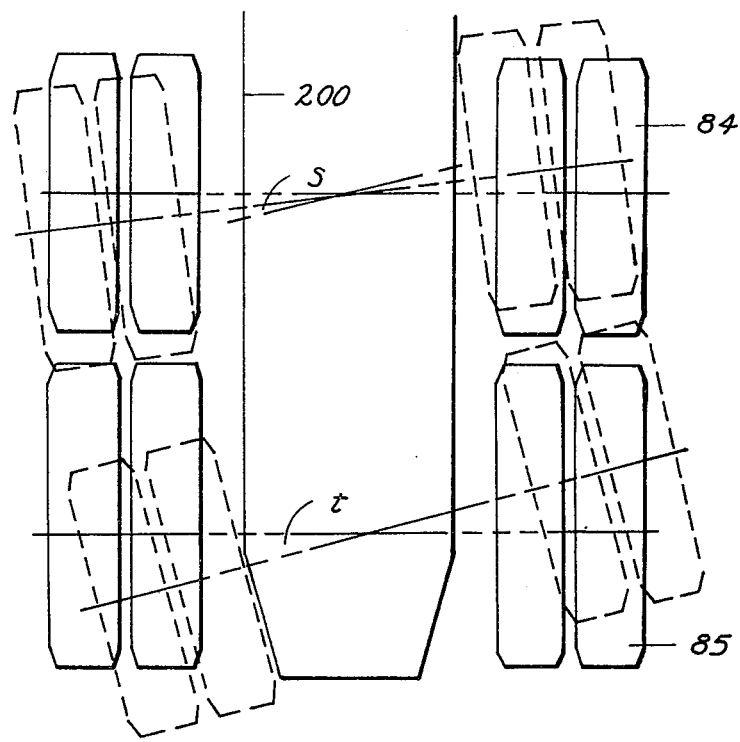
FIG. 8 is a schematic view of the bogie tire configurations in the straight-drive and hard turn positions.
Figure 9:
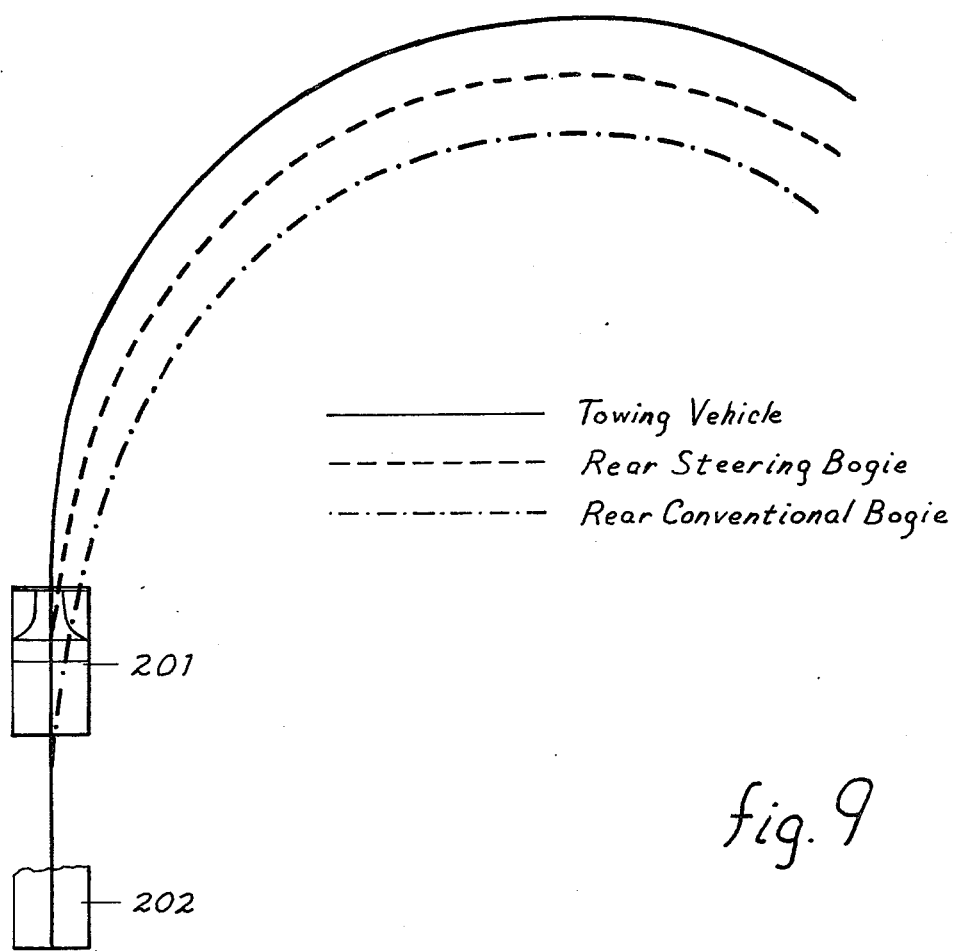
FIG. 9 illustrates the effect of the bogie on vehicle turning.

The change in the axle orientation produced by vehicle turning is shown diagrammatically in FIG. 8. Here the vehicle frame 200 is used as the fixed point of reference and the wheels in the straight-drive position (solid lines) and hard turn position (dotted lines) oriented accordingly. Angles t and (s) are the vehicle turning angle and bogie steering angle, respectively. In the embodiment of the invention that has been described, the ratio of (s) to t is about one-half. The increased maneuverability of the vehicle which the self-steering bogie provides is illustrated in FIG. 9. The articulated vehicle in this figure consists of a towing vehicle 201 and a towed trailer 202 (rear portion shown). As can be seen, the rear bogie steering allows the rear of the trailer to execute a sharper turn than would a conventional fixed bogie. The rear of the trailer then more closely follows the turning radius of the towing vehicle.

The above-described invention is intended to include all such modifications and changes encompassed in the following claims

What is claimed is:

1. A self-steering tandem axle bogie for a vehicle comprising:
   a. a pair of longitudinally extending frame supporting members;
   b. front and rear transversely extending wheel axles, opposite end regions of which are universally attached to end regions of the frame supporting members for sliding movement thereon, permitting relative angular movement between the two wheel axles in a common plane and independent tilt of each wheel axle out of said plane;
   c. a transversely extending steering unit for transmitting vehicle load to the frame supporting members, said unit being universally attached at opposite ends to the frame supporting members and longitudinally spaced between said front and rear axles; and
   d. a pair of steering arms, each arm coupling one of the end regions of said front axle to the corresponding transverse side of said steering unit by pivotal joining means at each end of said arm, for transmitting, upon vehicle turning occurring, angular movement between said steering unit and said frame supporting members to said front axle to effect angular movement of said front axle, relative to said rear axle, in the direction of vehicle turn.

2. A self-steering tandem axle bogie for a vehicle comprising:
   a. a pair of longitudinally extending walking beams;
   b. front and rear transversely extending wheel axles, opposite end regions of which are universally attached to said walking beams for sliding movement thereon, permitting relative angular movement between the two wheel axles in a common plane and independent tilt of each wheel axle out of said plane;
   c. a transversely extending steering unit for transmitting vehicle load to the two walking beams, said steering unit being universally attached at opposite ends to said beams and longitudinally spaced between said front and rear axles;
   d. a pair of steering arms, each arm coupling one of the end regions of said front axle to the corresponding transverse side of said steering unit by universal joining means at each end of said arm, for transmitting, upon vehicle turning occurring, angular movement between said steering unit and said walking beams to said front axle to effect angular movement of said front axle, relative to said rear axle, in the direction of vehicle turn; and
   e. rear coupling means universally coupling said steering unit to said rear axle.

3. The invention as set forth in claim 2 wherein each walking beam carries by rigid attachment a longitudinally extending rod at each beam end, and each end region of said front and rear axles carries by rigid attachment at each axle end region a universal joint assembly having a cylindrical cavity extending longitudinally therethrough for receiving slidably therein an associated beam rod, slidably and pivotally attaching said axle end regions to associated beam rods.

4. The invention as set forth in claim 2 wherein the rear coupling means is a trailing yoke having a pair of radial arms universally attached to the two end regions of the rear wheel axle, and a pivot arm universally attached to the center of the steering unit.

5. The invention as set forth in claim 2 further comprising locking means for locking the bogie in a straight-drive position.

6. A self-steering tandem axle bogie for a vehicle comprising:

a. a pair of longitudinally extending walking beams, each beam carrying by rigid attachment a longitudinally extending rod at each beam end;

b. front and rear transversely extending wheel axles, each end region of each said axle carrying by rigid attachment a universal joint assembly having a cylindrical cavity extending longitudinally therethrough for receiving slidably therein an associated beam rod, slidably and pivotally attaching said axle end regions to associated walking beam rods, permitting angular movement between the two wheel axles in a common plane and independent tilt of each wheel axle out of said plane;

c. a transversely extending steering unit for transmitting vehicle load to said walking beams, said unit being universally attached to the walking beams and longitudinally spaced between said front and rear axles;

d. a pair of steering arms, each arm coupling one of the end regions of said front axle to the corresponding transverse side of the steering unit by universal joining means at each end of said arm, for transmitting, upon vehicle turning occuring, angular movement between said steering unit and said walking beams to said front axle to effect angular movement of said front axle, relative to the rear axle, in the direction of vehicle turn;

e. a rear yoke universally coupling said steering unit to said rear axle; and f. means for locking the bogie in a straight drive position.

7. The invention as set forth in claim 6 in which each steering arm is universally attached to the corresponding transverse side of the steering unit at a position approximately midway between the center and the outer transverse edge of said unit.

* * * * *